United States Patent [19]

Beeler

[11] 4,177,308
[45] Dec. 4, 1979

[54] NON-COMBUSTIBLE HIGH TEMPERATURE ABRADABLE SEAL MATERIAL

[75] Inventor: David R. Beeler, Fairfield, Ohio

[73] Assignee: The United States of America as represented by the Secretary of the Air Force, Washington, D.C.

[21] Appl. No.: 932,814

[22] Filed: Aug. 10, 1978

[51] Int. Cl.$^2$ .............................................. C04B 21/00
[52] U.S. Cl. .................................. 428/117; 106/40 R
[58] Field of Search ........................... 106/40 R, 40 V; 428/117

[56] References Cited

U.S. PATENT DOCUMENTS

| 3,041,205 | 6/1962 | Iler | 106/40 R |
| 3,068,016 | 12/1962 | Dega | 428/117 |
| 3,126,149 | 3/1964 | Bowers, Jr. et al. | 428/117 |
| 3,991,254 | 11/1976 | Takeuchi | 106/40 R |

Primary Examiner—O. R. Vertiz
Assistant Examiner—Mark Bell
Attorney, Agent, or Firm—Joseph E. Rusz; Cedric H. Kuhn

[57] ABSTRACT

A non-combustible, abradable sealant composition for jet engines comprising a major amount of aluminum phosphate and a minor amount of silica or glass microspheres.

11 Claims, No Drawings

NON-COMBUSTIBLE HIGH TEMPERATURE ABRADABLE SEAL MATERIAL

RIGHTS OF THE GOVERNMENT

The invention described herein may be manufactured and used by or for the Government of the United States for all governmental purposes without the payment of any royalty.

FIELD OF THE INVENTION

This invention relates to a non-combustible, high temperature, abradable sealant composition for use in jet engines.

BACKGROUND OF THE INVENTION

In jet engines a seal is conventionally provided on the engine casing walls adjacent the ends of the rotor blades and on the ends of the stator blades adjacent the rotor. The function of the seals is to prevent leakage around blade tips with a resultant drop in air pressure. The sealant material must be abradable so as to prevent damage to the blades in the event blade tips strike the material during an engine unbalance condition.

A typical seal used in jet engines comprises an epoxy resin and phenolic microspheres. When contacted with rotating blade tips, this material abrades into a fine particle dust. In the fan section of a jet engine, most of this dust passes out of the engine through the by-pass duct. However, during an engine unbalance condition, in the booster stages, the abraded seal material flows into the higher temperature, higher pressure area of the engine. The conditions in this area are sufficient to cause essentially instantaneous decomposition of the material, resulting in an uncontrolled pressure rise with a possible following explosion within the engine.

It is a principle object of this invention, therefore, to provide a non-combustible, abradable sealant composition for jet engines.

Another object of the invention is to provide a seal material which will withstand service temperatures as high as 2500° F.

Other objects and advantages of the invention will become apparent to those skilled in the art upon consideration of the accompanying disclosure.

SUMMARY OF THE INVENTION

The present invention resides in a sealant composition in the form of a syntactic foam that comprises a major amount of aluminum phosphate and a minor amount of silica or glass microspheres. The sealant composition may also contain a minor amount of an inorganic filler, such as silica or talc, to add strength to the composition. A preferred sealant composition consists essentially of the following ingredients in parts by weight.

Aluminum Phosphate: 100
Silica or glass microspheres: 1.5–10
Inorganic filler: 0–5

The aluminum phosphate functions as an inorganic matrix for the microspheres which impart to the seal material the characteristics of a lightweight syntactic foam. The microspheres, which have a diameter of about 10 to 300 microns and to the naked eye appear as finely divided white sand, are commercially available items of manufacture.

The inorganic matrix is prepared by reacting orthophosphoric acid with aluminum hydroxide. The reaction involved in the preparation can be represented by the following equation:

$$H_3PO_4 + Al(OH)_3 \rightarrow AlPO_4 + 3H_2O.$$

It is usually preferred to employ stoichiometric amounts of the reactants although a molar excess of one or the other can be used without a deleterious effect. Thus, the mole ratio of phosphoric acid to aluminum hydroxide can range from about 0.8 to 1.2 to 1.

In a preferred procedure for preparing the sealant composition, initially the phosphoric acid and aluminum hydroxide are thoroughly blended to provide a reaction mixture of uniform consistency. The filler material, if used, is then added after which the microspheres are gradually stirred into the mixture. With high loadings of filler and microspheres, it has been found to be advantageous to add water or isopropyl alcohol in order to provide an easily workable composition.

The sealant composition prepared as described in the preceding paragraph can be readily troweled into place in the jet engine casing. Thereafter, the material is cured in an air circulating oven using a maximum cure temperature of 350° F. It has been found to be advantageous to apply a partial vacuum, e.g., 2 to 10 psi, during the cure cycle. Furthermore, a gradual cure whereby volatile materials are slowly removed has been found to provide optimum results. In a typical cure cycle, the sealant composition is heated for 2 to 8 hours at 150° F. followed by heating for 1 to 2 hours at each of the following temperatures: 200° F., 250° F., 300° F. and 350° F. To ensure completion of the cure, a postcure to a temperature up to 600° F. is desirable. A one-hour hold time at each 50° F. interval from 350° to 600° F. is usually sufficient to complete the cure.

Among other desirable properties, the sealant composition of this invention is characterized by the fact that it is abradable. Thus, if an engine unbalance occurs, the material abrades when contacted by rotor blades without damaging the blades. The sealant composition is non-combustible, being composed only of inorganic ingredients. As a result, the composition when abraded does not form explosive mixtures as do conventional sealants utilizing organic matrices. Currently, a different organic matrix is used for each seal application where temperature requirements differ. Epoxy matrices are normally limited to a service temperature of 350° F. while polyimides extend the use temperature to 450°–500° F. The aluminum phosphate used as the matrix for the present sealant composition constitutes a significant improvement since, in addition to being completely non-combustible having a measured heat of combustion of zero, it will withstand service temperatures as high as 2500° F. Depending upon the amount of microspheres and filler employed, the sealant composition has a density ranging from about 30 to 60 lbs/ft$^3$. The composition has a Shore D hardness of about 70 to 80.

The sealant composition can be employed to fill the cells of an aluminum or ceramic honeycomb so as to provide a smooth surface. The honeycomb is fabricated to conform to the walls of the jet engine adjacent the rotor blades. When adhesively bonded to the walls, the honeycomb with its cells filled with the sealant composition provides an effective seal.

It is within the purview of the invention to vacuum impregnate the cured sealant composition with an epoxy or silicone resin in order to provide the seal with improved abrasion and erosion characteristics and strength properties. In accordance with this procedure, the sealant composition immersed in a solution of the resin containing an appropriate curing agent is maintained under a vacuum for a period of about 1 to 6 hours. At the end of this period, the seal material is removed from the solution and excess resin wiped off. The resin-impregnated seal material is then oven cured. The curing catalysts used and the curing conditions followed are generally in accordance with recommendations of the suppliers of the resins. Any of the commercially available epoxy and silicone resins can be employed. The resin-impregnated seal material usually contains about 10 to 20 weight percent of the resin. While sealant compositions impregnated with a resin are no longer non-combustible, their heats of combustion are still comparatively low, e.g., from about 1200 to 1500 BTU/lb, as compared to conventional organic seals which are generally greater than 10,000 BTU/lb.

A more comprehensive understanding of the invention can be obtained by referring to the following illustrative examples which are not intended, however, to be unduly limitative of the invention.

EXAMPLE I

A run was conducted in which a sealant composition of this invention was prepared, utilizing the following formulation:

| Ingredient | Amount, g |
|---|---|
| Orthophosphoric acid (85%) | 86 |
| Aluminum hydroxide | 60 |
| Silica microspheres[1] | 25 |
| Water | 18 |

[1]Eccospheres ceramic Microballoons, a product of Emerson & Cuming Inc., Canton, Mass.

The aluminum hydroxide and microspheres were added to the phosphoric acid. Water was added to the mixture to provide for good mixing. The mixture was cured under a vacuum bag for 2 hours each at 150° F. and 200° F. and at 1 hour each at 250° F., 300° F. and 350° F. The density of the foamed composition was determined to be 38 lbs/ft$^3$. The foam was postcured for 60 minutes at each 50° F. interval from 350° to 600° F. After postcuring the density of the foam was calculated to be 34 lbs/ft$^3$.

Samples cut from the cured foam were sanded square and then subjected to several tests. Sample 1 (density 35.4 lbs/ft$^3$) was heat aged for 65 hours at 1950° F. Although cracks developed in the sample, it remained in one piece. The weight of the sample after heat aging was 13.73 g, representing a weight loss of 1.07 g or 7.2%. Sample 2 (density 34.8 lbs/ft$^3$) was heated in an aging oven at 900° F. for 250 hours. The sample was completely intact with no signs of cracking or oxidation. The sample possessed as much structural integrity as it had prior to aging. The density of the foam after aging was calculated to be 34.6 lbs/ft. The foam lost 0.68 g in weight or a 4.2% weight loss. Sample 3 was subjected to an acetylene torch test. The foam melted at 3000° F.; there was no visible damage at 2000° F.

EXAMPLE II

A run was carried out in which a sealant composition of this invention was prepared, using the following formulation:

| Ingredient | Amount, g |
|---|---|
| Orthophosphoric acid (85%) | 42 |
| Aluminum hydroxide | 40 |
| Silica filler | 1 |
| Glass microspheres[1] | 5 |

[1]Eccospheres glass Microballoons FT102, a product of Emerson & Cuming Inc., Canton, Mass.

The phosphoric acid and aluminum hydroxide were mixed initially after which the silica filler and glass microspheres were added. A portion of the reaction mixture was allowed to stand at room temperature and was found to have a workable life of about 15 minutes. Another portion of the reaction mixture was stored in ice water for 4 hours. This portion of the mixture was still workable at the end of the 4 hour period. The foam so prepared was used to fill an aluminum honeycomb and made an excellent bond to the honeycomb cells.

EXAMPLE III

A series of runs was carried out in which sealant compositions of this invention were prepared, utilizing the following formulations:

| Ingredient | Amounts, g | | |
|---|---|---|---|
| | A | B | C |
| Orthophosphoric acid (85%) | 42 | 42 | 42 |
| Aluminum hydroxide | 40 | 40 | 40 |
| Silica filler | 2 | 1 | 1 |
| Glass microspheres[1] | 3 | 4 | 5 |

[1]See footnote to formulation of Example II.

In each run, the phosphoric acid and aluminum hydroxide were initially mixed to a uniform consistency. The filler material was added next after which the glass microspheres were added and stirred into the reaction mixture. Three specimens were prepared from each formulation: (1) the as-prepared, (2) 3-mil aluminum honeycomb filled, and (3) 6-mil aluminum honeycomb filled. Curing was accomplished in an oven with pressure in accordance with the following schedule: 8 hours at 150° F., 2 hours at 200° F., 2 hours at 250° F., and 1 hour each at 300° F. and 350° F.

The as-prepared specimens had a density of 65 lbs/ft$^3$ (A), 55 lbs/ft$^3$ (B), and 53 lbs/ft$^3$ (C). The 3-mil aluminum honeycomb specimen was tested for erosion, and the results indicated a 53% improvement in erosion protection over an unfilled core. Rub tests on the 3-mil aluminum honeycomb specimen utilizing a rotor with six rotating blades showed that there was no blade tip wear.

From the foregoing, it is seen that the present invention provides a non-combustible, high temperature, abradable sealant composition which overcomes problems associated with conventional organic seals for jet engines. The material bonds well to honeycomb structures so that it can be used either alone or in combination with honeycombs in providing effective seals.

As will be evident to those skilled in the art, modifications of the present invention can be made in view of the foregoing disclosure without departing from the spirit and scope of the invention.

I claim:

1. A sealant composition for jet engines, said composition being in the form of a syntactic foam and comprising a major amount of aluminum phosphate and a minor amount of silica or glass microballoons having a diameter of about 10 to 300 microns.

2. The sealant composition according to claim 1 in which the sealant composition is in the form of a non-combustible, abradable syntactic foam.

3. The sealant composition according to claim 1 which contains a minor amount of an inorganic filler.

4. The sealant composition according to claim 3 in which the inorganic filler is silica or talc.

5. The sealant composition according to claim 1 which consists essentially of 100 parts by weight of aluminum phosphate, about 1.5 to 10 parts by weight of silica or glass microballoons and about 0 to 5 parts by weight of an inorganic filler.

6. The sealant composition according to claim 5 which has a density ranging from about 30 to 60 lbs/ft$^3$ and a Shore D hardness of about 70 to 80.

7. The sealant composition according to claim 6 which is impregnated with an epoxy or silicone resin.

8. The sealant composition according to claim 7 in which the resin-impregnated sealant composition contains about 10 to 20 weight percent of the resin.

9. An article of manufacture comprising an aluminum or ceramic honeycomb having cells containing a sealant composition in the form of a non-combustible, abradable syntactic foam comprising a major amount of aluminum phosphate and a minor amount of silica or glass microballoons having a diameter of about 10 to 300 microns.

10. The article of manufacture of claim 9 in which the sealant composition consists essentially of 100 parts by weight of aluminum phosphate, about 1.5 to 10 parts by weight of silica or glass microballoons and about 0 to 5 parts by weight of an inorganic filler.

11. The article of manufacture of claim 10 comprising an aluminum honeycomb having cells containing a sealant composition consisting essentially of 100 parts by weight of aluminum phosphate, about 1.5 to 10 parts by weight of glass microballoons and about 0 to 5 parts by weight of a silica filler.

* * * * *